March 30, 1954  W. M. BRAUN  2,673,925
PORTABLE UTILITY LAMP
Filed Aug. 3, 1950  2 Sheets-Sheet 1
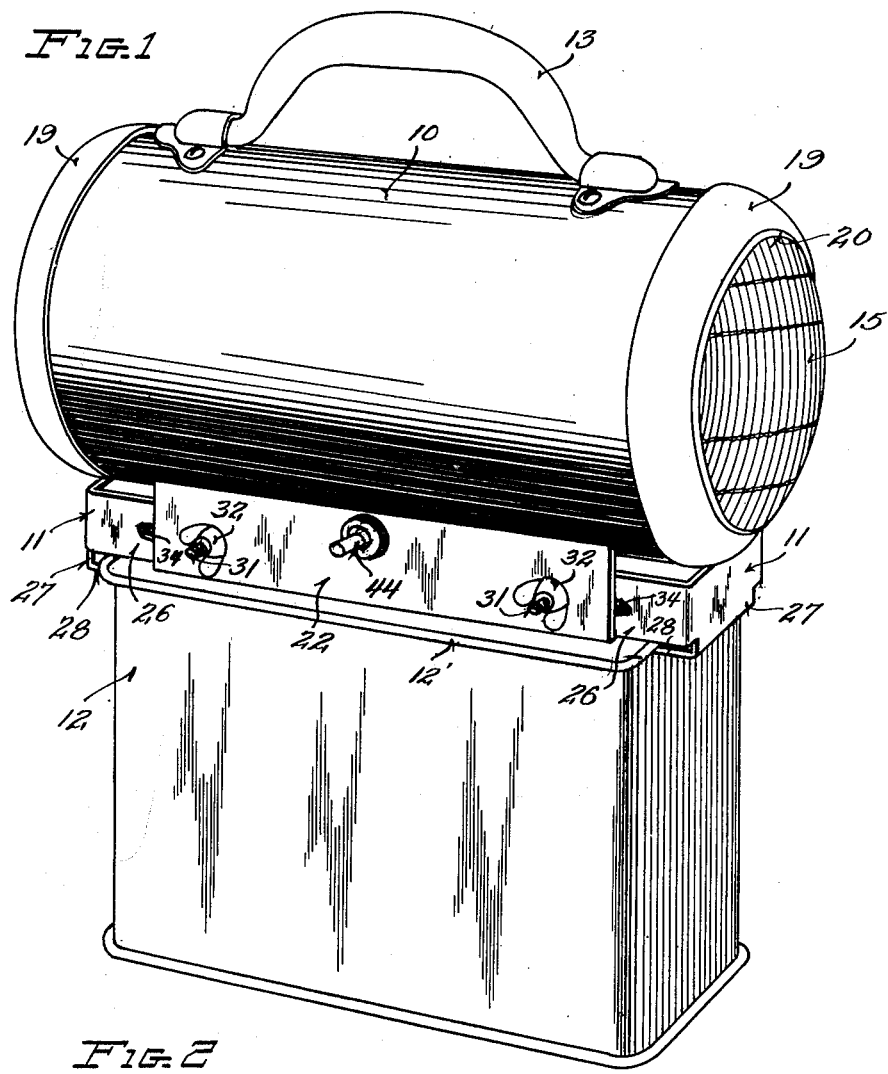
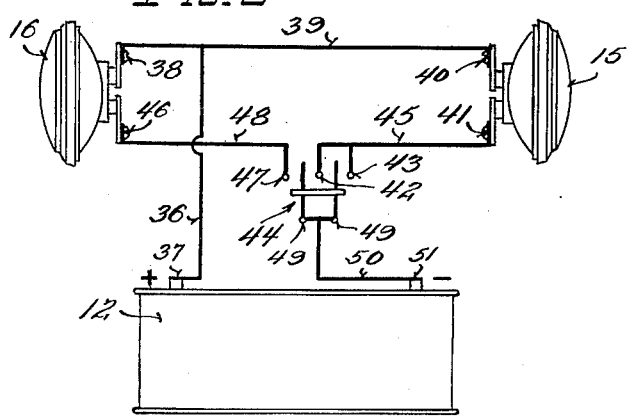
INVENTOR.
WALTER M. BRAUN
BY
ATTORNEY March 30, 1954 — W. M. BRAUN — 2,673,925
PORTABLE UTILITY LAMP
Filed Aug. 3, 1950 — 2 Sheets-Sheet 2
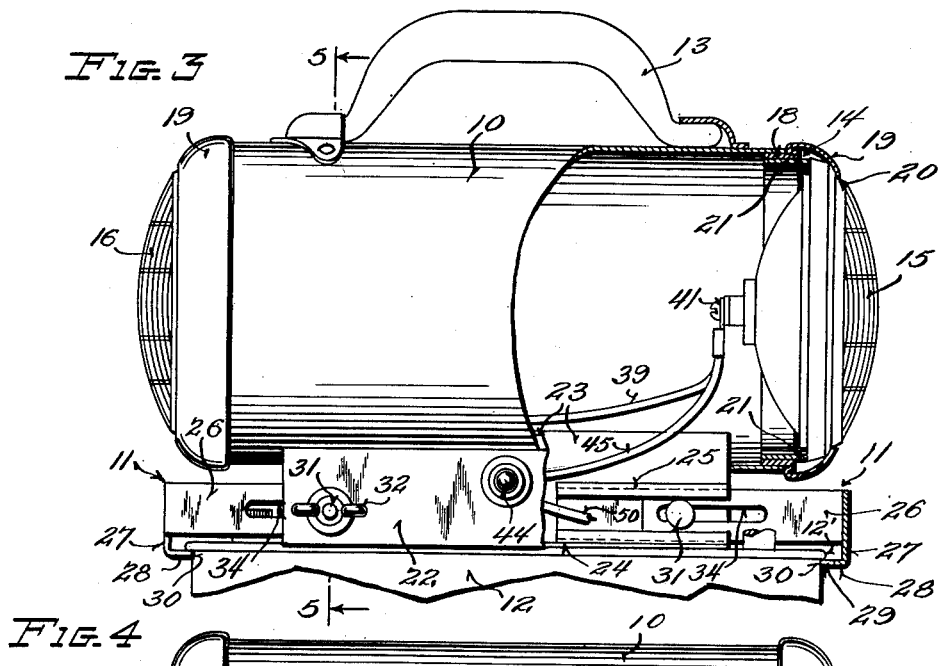
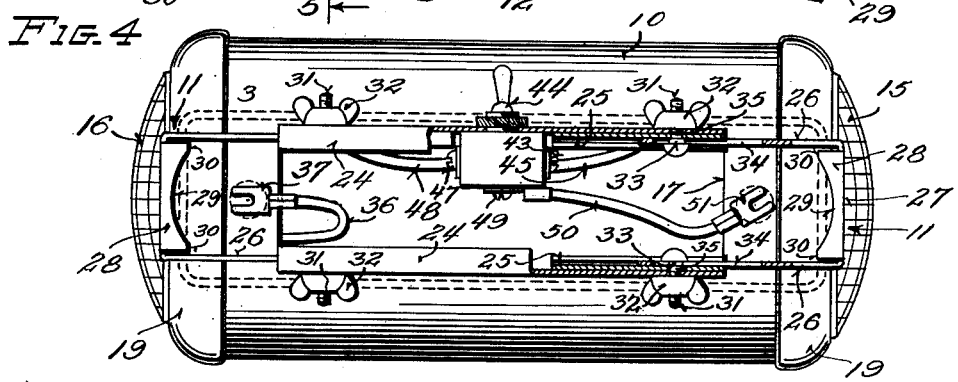
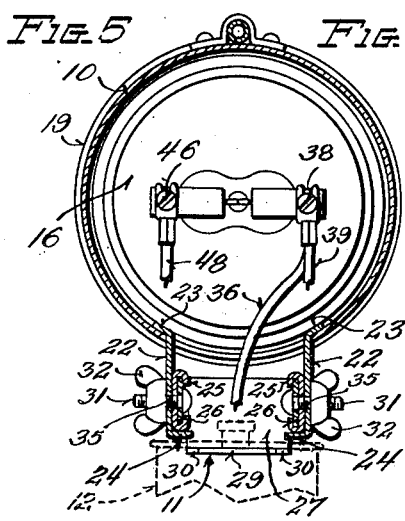
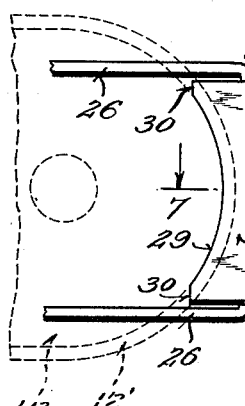
INVENTOR.
WALTER M. BRAUN.
BY Erwin B. Eiring
ATTORNEY Patented Mar. 30, 1954

2,673,925

UNITED STATES PATENT OFFICE 2,673,925

PORTABLE UTILITY LAMP

Walter M. Braun, Whitefish Bay, Wis.

Application August 3, 1950, Serial No. 177,395

4 Claims. (Cl. 240—10.61)

This invention relates to portable utility lamps and more particularly to electric powered hand lamps having many and varied uses.

The primary object of the present invention resides in the provision of a new and improved electric powered hand lamp adapted for ready applicaton to and removal from a power source in the form of a standard metal clad battery.

Another object of the invention resides in the provision in a portable service lamp of a new and improved means in the form of clamping members arranged to grip the battery and provide simple and effective means for releasably retaining the battery in unitary association with the lamp.

Another object of the invention resides in the provision of a portable hand lamp adapted for attachment to a suitable power source in the form of a standard battery which serves as a base for the unit.

Another object of the invention resides in the provision of a portable service lamp utilizing standard sealed beam lights which are readily replaceable in the event that they burn out or are broken.

Another object of the invention resides in the provision of a new and improved portable utility lamp including a white light and a red light together with manually operable means for selectively illuminating the white light for service purposes or illuminating both white and red lights to permit the device to be used for both service and safety or warning signal purposes simultaneously.

Another object of the invention resides in the provision of a new and improved electric powered portable utility lamp constructed in a manner to facilitate the repair or replacement of broken or worn out parts without requiring the dismantling of the device in order to gain access to the operating parts of the lamp.

Another object of the invention resides in the provision in a portable electric powered service lamp of simple and effective means for establishing the electrical connection of the lamp to the battery terminals and for effecting the clamping of the hand lamp to the battery in a matter of a few seconds time without requiring the use of any hand tools.

Another object of the invention resides in the provision of a new and improved portable utility lamp embodying an electrical circuit including a manually operable switch adapted for selective use to establish an electrical circuit for illuminating the service light only or to effect the simultaneous lighting of both the service light and the red signal or safety light.

Another object of the invention resides in the provision in a portable electric powered service lamp of an electrical circuit including a plurality of connector wires each arranged for releasable application to their respective points of connection in the circuit to facilitate the replacement of broken or worn out parts without requiring the dismantling of the device to effect the desired repair or replacement.

Other objects and advantages of the present invention will become apparent from the following description of an illustrative embodiment of the device constructed in accordance with its teachings.

In the drawings—

Figure 1 is a perspective view of a portable electric powered utility lamp constructed in accordance with the teachings of the present invention;

Fig. 2 is a diagrammatic view of the device shown in Fig. 1 including the sealed beam lights, battery and a schematic wiring diagram illustrating the electrical circuit embodied in the unit;

Fig. 3 is a side elevational view of the unit shown in Fig. 1 with parts broken away and shown in section to disclose some of the structural features of the device;

Fig. 4 is a bottom plan view of the portable utility lamp with parts broken away and shown in section to illustrate the construction of the adjustable battery clamping members;

Fig. 5 is a vertical sectional view taken on the line 5—5 of Fig. 3 showing the details of construction of the lamp casing and the battery retaining clamping means together with portions of the electrical connections;

Fig. 6 is an enlarged bottom plan view of one of the battery clamping members illustrating its application to a standard metal clad battery having rounded ends; and Fig. 7 is a vertical sectional view taken on the line 7—7 of Fig. 6 showing the battery contacting and gripping portion of one of the battery clamping members.

Before proceeding with a detailed description of the present invention, it is believed that a brief statement regarding the structure and practical uses of the portable service lamp will serve to emphasize its many advantages over devices now in common use for similar purposes.

Practically all campers, hunters, fishermen, many other sportsmen and a large majority of motorists consider a portable utility or service lamp an essential piece of equipment. In choosing a device of this type, the experienced user is particularly careful in the purchase of a portable utility lamp to obtain one which combines the greatest number of essential characteristics; namely, one which is sturdy, compact, simple in construction, capable of ready repair and above all one which has a long usable life expectancy.

Applicant's portable electric powered utility or service lamp provides a new and improved device which combines all of the desirable features in a single unit by providing a device which may readily be attached to or detached from any standard 6 volt metal-clad battery, having either flat or rounded ends, without requiring the use of hand tools, through the medium of adjustable battery clamps which are adapted for releasable gripping engagement with the battery to provide a carrying means for the battery which in turn provides a base for the lamp structure. The use of any standard 6 volt metal-clad battery in conjunction with the present invention provides a simple and sure solution for the problem of long trouble-free operation of the utility lamp. At the end of the normal life of the battery, it may be replaced quickly and easily without the aid of tools. A further advantage of the present portable service lamp lies in the fact that standard sealed beam lights, which are obtainable readily at any garage or service station, are embodied in the device. While this type of light is well known for its long life and satisfactory service, should accidental breakage occur, the sealed beam light may be quickly and easily replaced in the lamp structure without necessitating major dismantling of the lamp. A further advantage of the present portable service lamp will be found in the construction of the electrical circuit, each wire of which is provided with terminal connectors, which greatly facilitate both the attachment of the lamp to the battery and also the replacement of individual parts of the lamp, such as the sealed beam lights or even the switch without requiring the device to be dismantled.

While the portable electric powered utility or service lamp of the present invention is designed for general usage, it is particularly well adapted for use by motorists in making tire changes on the highways. This important use of the device is made possible by the inclusion in the lamp of a red signal or warning light positioned at the rear of the casing in addition to the white service light at the front of the casing. The lamp is provided with a manually operable switch adapted to be thrown selectively from a neutral position to a forward position in which only the service light is illuminated or to a rearward position in which both the service light and the red signal or warning light are illuminated.

Referring more particularly to the accompanying drawings, the portable utility lamp, constructed in accordance with the teachings of the present invention and chosen for illustrative purposes, comprises a casing 10 provided with adjustable clamping members 11 adapted for releasable gripping engagement with a standard metal-clad battery 12 to form a self-contained unit which is sturdy, compact and readily portable by means of a carrying handle 13 mounted in any suitable manner on the casing 10.

The casing 10, preferably cylindrical in shape and formed of sheet metal, is provided with open ends 14, each of which is adapted to receive one of a pair of sealed beam lights 15 and 16. The sealed beam light 15 is formed with a clear glass lens to provide a white service light while the sealed beam light 16 is formed with a colored glass lens, preferably red, to provide a warning or signal light. The casing 10 is also provided with an opening 17 in its under side through which the battery connector leads pass and in which the mounting means for the adjustable clamping members 11 are positioned.

The mounting structure for the sealed beam lights 15 and 16 positioned at the opposite ends of the casing 10 are identical (one of which is shown in section in Fig. 3) and each comprises a reinforcing ring 18 secured, in any approved manner, to the inner surface of the casing 10 and having a portion projecting beyond the open end 14 of the casing 10 to form a surface adapted to receive and frictionally engage the flange portion of the light retaining ring 19 having a central opening 20 arranged to cooperate with a flange formed on the sealed beam light to position the same against a plurality of light positioning stop members 21 secured, in any approved manner, to the inner surface of the reinforcing ring 18. While the retaining ring 19 is normally constructed in a manner such that it is frictionally retained in proper position on the projecting portion of the reinforcing ring 18, it may also be secured in position on the ring 18 by the application of a locking screw, if desired. The above described mounting structure for the sealed beam lights provides a simple and effective means positioning and retaining the lights in the unit and at the same time it provides a means by which the lights may be replaced quickly and easily in the event that a light should burn out or be broken.

The mounting structure for the adjustable battery clamping members 11 comprises a pair of plates 22 having upper curved flanges 23 arranged for insertion into the casing 10 through the bottom opening 17 and adapted to be secured to the inner surface of the casing along the longer sides of the opening, in any approved manner, so that the plates 22 extend downwardly from the casing and lie in parallel planes disposed longitudinally of the casing 10. The plates 22 are further provided with inwardly directed bottom flanges 24 which serve to strengthen the plates and prevent their distortion under the weight of the battery. A plurality of channel members 25 are brazed or soldered in place on the inner surface of plates 22, one adjacent each end of each plate, and are arranged to serve in pairs as slide guides for the pair of parallelly disposed legs 26 of each of the battery clamping members 11. The battery clamping members 11 are preferably formed of sheet metal and in addition to the leg portions 26 each include a leg connecting base portion 27 which is somewhat greater in height than the legs 26. The lower edge of each base portion 27 is provided with an inwardly directed flange 28 which lies in spaced relationship with the bottom edge of the legs 26 and parallel therewith. The inner edge of each of the flanges 28 includes a central arcuate portion 29, having a radius substantially equal to the radius of the battery casing of a round ended standard 6 volt metal-clad battery, and a pair of flat portions 30 which extend outwardly from the respective ends of the arcuate portion 29 and lie in a plane parallel to the base portion 27 of the clamping member 11, adapted to contact the ends of a standard 6 volt metal-clad battery having flat ends. As previously stated, the battery clamping members 11 are adjustably mounted for sliding movement toward and from each other and the means for releasably retaining them in the desired battery engaging and clamping position comprises a plurality of manually operable anchoring devices in the form of bolts 31 and wing or thumb nuts 32. Each bolt 31 includes a square portion 33, receivable in a slot 34 formed in each leg 26 of the clamping members 11 and cooperating therewith to prevent rotation of the bolt 31 regardless of the position of adjustment of the clamping members 11 within the channel members 25 which adjustment is limited by the length of the slots 34. The position of each bolt 31 is fixed by passing the same through a locating hole 35 extending through the channel members 25 and the plates 22. The wing or thumb nuts 32 are then applied to the outwardly extending portion of each of the bolts 31 and the nuts may be tightened to effect the locking of the clamping members 11 in desired position of adjustment or may be loosened to permit the sliding of the members 11 to facilitate the application of the unit to the battery or its removal from the battery.

The electrical circuit for the device is shown diagrammatically in Fig. 2 and comprises battery cable or lead wire 36 provided with a usual battery clip or connector 37 secured to its free end for attachment to the positive post of the battery 12; the other end of the battery cable 36 is similarly attached to a filament terminal 38 on the sealed beam light 16. A wire 39 connects the terminal 38 of the sealed beam light 16 with a terminal 40 on the sealed beam light 15. The other terminal 41 of the filament of the light 15 is connected to a pair of spaced contact points 42 and 43 of a control switch 44 by means of a lead wire 45. The other filament terminal 46 of the light 16 is connected to a contact point 47 of the control switch 44 by a lead wire 48. The other side of the switch 44 has a pair of connected terminals 49 to which one end of a battery cable or lead wire 50 is attached. The free end of the cable 50 is provided with a usual battery clip or connector 51 adapted for ready attachment to the negative post of the battery 12. Since the control switch 44 is a double throw switch, it has an intermediate "off" position and two "on" positions, one to each side of the "off" position. It should be noted, at this point, that each of the battery cables 36 and 50 and the other lead wires 39, 45 and 48 are provided with connectors on both ends of the wires to facilitate ready attachment to or removal of the wires from their respective points of connection in electrical circuit and also that each of the wires above mentioned are of sufficient length to afford a considerable amount of slack between their respective connections so that the light circuit of the lamp may be established by attaching the connectors 37 and 51 of the cables 36 and 50, respectively, to the positive and negative binding posts of the battery 12 before the lamp is attached to the battery by means of the clamping members 11. The slack in the other lead wires in the circuit permits the withdrawal of either of the sealed beam lights 15 or 16 after the retaining ring 19 has been removed to effect the ready replacement of either or both sealed beam lights, if this be necessary, merely by removing the lead wires from the filament terminals of the broken or burned out light and attaching them to the terminals of a new or replacement light.

A brief description of the method of connecting the electrical circuit of the utility lamp to the binding posts of the battery and effecting the attachment of the lamp portion of the unit to any standard metal-clad 6 volt battery, which forms a base for the unit will serve to emphasize the facility with which the unit may be set up for operation. All 6 volt standard metal-clad batteries, whether they are rectangular in horizontal longitudinal cross section or are provided with rounded ends, are formed, during the process of their manufacture, with peripheral beads 12' which extend around the top and bottom marginal edges of the battery. The presence of the top marginal bead 12' provides an outwardly projecting flange-like surface which forms an abutment against which the top surface of the flange 28 bears when the flat portions 30 contact the flat ends of a rectangular battery 12) as shown in Figs. 1 and 3) adjacent the bead 12'; or when the arcuate surface 29 on the inner edge of the flange 28 contacts the rounded ends of another form of standard battery 12 (as indicated in dotted lines in Fig. 6). The first step in setting up the unit is to secure the free end of the battery cable 36 to one of the binding posts on the battery 12 and then securing the free end of the battery cable 50 to the other binding post on the battery; to complete the electrical connection of the utility lamp to the battery which forms the source of electrical energy for the sealed beam lights 15 and 16. After the electrical connections have been completed, the several wing nuts 32 may be loosened to permit the adjustable battery clamping members 11 to be slid outwardly in the channel members 25 to positions where the inner edges of the flanges 28 pass the ends of the battery 12 when the casing 10 is placed on the top of the battery. The clamping members 11 may then be moved toward each other until such time as the surfaces 30 of the flanges 28 on the members 11 contact the ends of the battery 12 and the upper surface of the flange 28 contacts the lower surface of the bead 12' on the upper marginal edge of the battery. At this position of adjustment of the battery clamping members 11, the wing nuts 32 should be tightened to securely anchor the battery clamping members in gripping engagement with the battery to provide a unitary structure in which the battery forms a base for the lamp casing 10 and the gripping action of the clamping members 11 positions and retains the battery 12 so that the unit is readily portable by means of the carrying handle 13 attached to the casing 10.

With the unit set up in the manner previously described, the utility lamp is ready for selective use as a service light or as a combined service and warning or signal light. When the lamp is desired for service purposes, the control switch 44 is thrown toward the clear sealed beam light 15 in which position only the clear or white light 15 is energized. With the switch 44 closed in the forward, or service light only position, current flows from the positive post of the battery 12 through wires 36, 39 and the filament of the sealed beam light 15 and thence back to the battery 12 through the wire 45, contact points 42 and 43, through the switch 44, contact points 49 and battery cable 50, to complete the circuit for energizing the white or service light alone. If the user desires to illuminate both the service light 15 and the warning or signal light 16, the control switch 44 may be thrown toward the colored sealed beam light 16 in which position both of the sealed beam lights 15 and 16 are energized. With the switch 44 closed in the double light position, current flows from the positive post of the battery 12 through wires 36 and 39 to the filaments of both of the sealed beam lights 15 and 16 with the circuit to the battery 12 completed from the filament of light 16 through wire 46, switch 44, contact point 49 and battery cable 50; while the circuit from the filament of the light 15 is completed through wire 45, contact point 42, switch 44, contact point 49 and the battery cable 50.

From the foregoing description, it will readily be understood that a simple and effective portable utility lamp has been provided which may be attached to standard form of battery to form a unitary structure which will give many hours of service from a single battery and one which affords simple and effective means for replacing broken or burned out sealed beam lights without requiring major dismantling of the structure to effect the desired repair or replacement should the same become necessary.

While the invention has been described in considerable detail in the foregoing specification, it is to be understood that various changes may be made in its embodiment without departing from or sacrificing any of the advantages hereinafter claimed.

I claim:

1. The combination with a metal-clad battery having a top marginal bead thereon and a utility lamp comprising an open-ended hollow cylindrical casing including a service light and a colored or signal light mounted at opposite ends of said casing of means for releasably retaining said utility lamp on said metal-clad battery to provide a portable device, said means comprising a pair of longitudinally disposed parallelly arranged plates projecting outwardly from said casing, battery engaging clamping member support and guide means on the opposite ends of said plates, a battery engaging clamping member disposed at each end of said plates, and manually operable anchoring means for releasably retaining one of said clamping members in adjusted position with reference to the other of said clamping members whereby both of said clamping members are in gripping contact with the bead of said metal-clad battery to releasably retain said utility lamp on said battery.

2. The combination as set forth in claim 1, in which, both of said battery engaging clamping members are slidably adjustable in said support and guide means.

3. The combination as set forth in claim 1, in which, the said battery engaging clamp supporting and guide means comprise channel members.

4. The combination as set forth in claim 1, in which, the said battery engaging clamping members include inwardly turned flanges disposed below said plates.

WALTER M. BRAUN.

References Cited in the file of this patent

UNITED STATES PATENTS

| Number | Name | Date |
| --- | --- | --- |
| 1,338,222 | Hazelett | Apr. 27, 1920 |
| 1,432,907 | Rhoads, Jr. | Oct. 24, 1922 |
| 2,320,917 | Ely | June 1, 1943 |
| 2,467,207 | Gulyban | Apr. 12, 1949 |
| 2,510,321 | Sauer | June 6, 1950 |

FOREIGN PATENTS

| Number | Country | Date |
| --- | --- | --- |
| 536,124 | Great Britain | May 2, 1941 |